Dec. 23, 1941.    W. H. BYLER ET AL    2,266,738
RADIO-ACTIVE FILM
Filed March 30, 1940
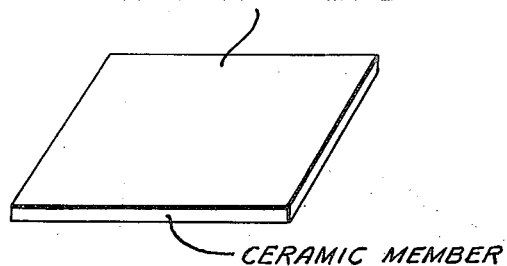
INVENTORS
William H. Byler
Clarence W. Wallhausen
BY
ATTORNEY Patented Dec. 23, 1941

2,266,738

UNITED STATES PATENT OFFICE 2,266,738

RADIOACTIVE FILM

William H. Byler and Clarence W. Wallhausen, Morristown, N. J., assignors to United States Radium Corporation, New York, N. Y., a corporation of Delaware Application March 30, 1940, Serial No. 327,078

11 Claims. (Cl. 250—106)

This invention is concerned with radio-active films and particularly with films capable of radiating alpha rays of high intensity.

Radio-active substances, because of their ability to emit alpha, beta, and gamma rays separately or in various combinations, are capable of ionizing gases in their immediate vicinity. Thus, radio-active substances may be employed to neutralize static charge built up in various apparatus, for example, in a rapidly moving paper tape or in aircraft in flight, by ionizing gases in the vicinity of such apparatus. Moreover, such rays may be employed to kill microorganisms and for various other purposes.

The ability to ionize gases is possessed by each of the emitted rays but is greatest for the alpha radiation and least for the gamma. When an ionized field of high intensity is required, it is desirable to utilize as large a proportion as possible of the available alpha radiation from a given source. However, alpha radiations, despite their marked superiority for causing ionization are the least penetrating of the three types of rays and are completely absorbed or otherwise stopped by thin media. For example, sheet aluminum of 0.006 centimeter thickness or a thin sheet of paper will completely absorb alpha rays; and the range of alpha rays in a gas is relatively short compared to the range of the beta and the gamma rays, although the intensity of the ionization produced by the alpha rays in their range is high— much higher than the intensity of ionization along the path of beta or gamma rays.

It has been proposed heretofore to employ radio-active materials to ionize gases and to neutralize static charges developed, for example, in air craft in flight. The proposals, however, have resulted in ineffective use of radio-active materials employed. In other words, the efficiency of ionization has been low and only a small proportion of the emitted energy has been usefully consumed.

Because of the short range of alpha rays, it is desirable to have them emitted from a film of radio-active material into, for example, a gas so that the large proportion of the gas will be irradiated. However, it has been difficult heretofore to produce a film of radio-active materials with high ionizing efficiency, especially with respect to alpha radiations. These difficulties are due in part to the short range of alpha radiations, and in part to the fugitive character of emanations and solid decay products of the particular radio-active substance. Thus, if the active source of the rays is either radium or mesothorium (elements which precede the radio-active emanations, i. e., radon and thoron, in the radio-active series of the elements) maximum alpha ray effect is not obtained unless the emanation can be held and allowed to decay in the space in which the ionized field of high intensity is required. In other words, if the active source is radium and the emanation, say radon, is permitted to escape, only the alpha radiation due to radium itself will be available and the alpha radiation from the emanation radon (which is gaseous) and from the solid decay products will be lost. If the active source is mesothorium and the emanation thoron is permitted to escape, only the alpha radiation due to radiothorium and thorium X are available to cause ionization. On the other hand, if the emanation is held or retained adjacent the point where an ionized field of high intensity is required, the alpha radiation from the emanation and from the solid decay products is made available and is added to the radiations from the radium in the one case and from the radiothorium and thorium X in the other.

It is desirable, therefore, in forming a film with a high alpha ray activity to assure that the radioactive material will not be masked by a binder or other substance through which the rays cannot penetrate or in which they are absorbed and at the same time to assure that the emanations are held in the film.

As a result of our investigations, we have produced a film of high efficiency with respect to alpha rays and one in which the alpha rays are not masked and in which both emanations and solid products of decay are retained so that they give off their alpha radiation at the point of intended use. In accordance with our invention, a radio-active film is produced on a piece of ceramic, for example, porcelain or other heat resistant refractory ceramic material of the required size and shape by distributing over the surface of the material a salt of a radio-active element, for example, radium bromide, chloride or sulfate. The ceramic thus coated is then heated to form a glaze on its surface, by reaction between the salt and the ceramic as shown in the drawing.

The formation of the glaze and the distribution of a small quantity of radio-active material over a large surface may be furthered by mixing the radio-active salt with a non-active diluent, such, for example, as a salt of a non-active metal. A great variety of non-active salts which form a glaze on the particular surface at a temperature below that at which radio-active salt tends to volatilize may be employed. Barium salts, particularly barium chloride, are particularly desirable, due to the similarity of chemical behavior of barium and radium.

The proportion of diluent salt and radio-active salt to employ will depend upon the desired intensity of radiation of the resultant glaze. When very high intensity is desired, no diluent salt need be employed, and, generally speaking, no more diluent salt should be employed than is necessary to secure the desired distribution of the radio-active substance over the surface to be treated, since an excess may tend to form a glaze of excessive thickness, thereby unduly masking the radio-active substance.

The radio-active salt, with or without the diluent salt, may be applied either in the dry state or as a solution or suspension. Uniform distribution is furthered by employing a solution, and this method is preferred.

The material upon which the radio-active film is applied should be one upon which a glaze is formed by the particular salts employed at a temperature below that at which radio-active salt is lost by volatilization. A temperature of 1050° C. is permissible in forming a glaze with radium chloride or bromide and chloride mixed. A variety of ceramics may be employed, but care should be taken either to employ a relatively non-porous material or else to apply the radio-active substance under such conditions that the pores do not absorb a large proportion of the substance. If the radio-active substance is applied by a wet method (i. e., as a solution or suspension) absorption may be minimized by heating the surface to be glazed prior to application of the solution or suspension so that the liquid thereof will evaporate so rapidly that it cannot penetrate the pores substantially. Unglazed porcelain is a suitable base.

To consider our invention with greater particularity, a piece of ceramic material, for example, porcelain of the required size and shape is thoroughly cleaned to remove grease and dirt and dried. The solution of a water-soluble radium salt, such as the bromide or chloride, or a suspension of an insoluble salt, such as the sulfate is prepared in a liquid medium, preferably water. The solution or suspension is then distributed as uniformly as possible over the surface of the porcelain. The liquid medium is then evaporated and the dried porcelain is heated in a furnace or the like until the salts form a glaze on the surface.

As indicated above, a diluent, preferably a salt which at high temperatures combines with the ceramic material to form a glaze may be mixed with the radio-active substance in dry or wet state. Thus, if the amount of radio-active salt required per unit area of film is small the use of a diluent salt is desirable in order to assure a more satisfactory glaze. On the other hand, if the amount of radio-active salt required per unit area of the ceramic is large, use of the diluent salt can be avoided.

The proportion of radio-active salt to surface area of the ceramics is adjusted to give the desired degree of radio-activity to the film. Naturally, the higher is the ratio of radio-active salt to the area upon which it is applied, the greater will be activity of the final film.

In evaporating the liquid medium employed in the suspension or solution of the radio-active salt, the surface of the ceramic material should be maintained at a temperature slightly below the boiling point of the liquid carrier. This allows rapid evaporation to take place without allowing the radio-active salt to penetrate too deeply into the ceramic. Generally speaking, the ceramic should not be so porous that it tends to absorb the radium suspension or solution rapidly, or conversely, if porous ceramic is employed the solution or suspension should be applied while the ceramic is kept at a temperature close to the boiling point of the liquid medium so that evaporation will be almost instantaneous.

A preferred method of preparing the radio-active film of our invention is as follows. The ceramic to be glazed is a piece of unglazed porcelain which is either non-porous or has an extremely fine porosity. This porcelain is cleaned and dried.

The treatment solution for coating the porcelain plate is made by mixing a measured amount of water solution of radium bromide or radium chloride containing the quantity of radium required upon the finished surface with a water solution of barium chloride containing an amount of barium equivalent to 10 times the amount of radium in the other solution. The total volume of the combined solutions is adjusted by adding water.

The solution is then spread over the cleaned porcelain surface. If the surface is a flat one, the solution may be distributed relatively uniformly with a glass rod or the like. If the form of the surface to be treated is such as to prevent depositing the total solution as a continuous film, the solution is applied drop by drop at various points over the slightly warmed surface. In either case, the application should be carried on while the porcelain is at a temperature of 85–95° C.

The liquid in the solution evaporates rapidly. When the liquid has evaporated completely, the ceramic with its adhering deposit of mixed radium and barium salts is placed in a muffle furnace and heated at 1050° C. for a period of ten minutes, during which an adequate glaze is formed on the porcelain. The glazed plate is then removed from the muffle and allowed to cool.

The cooled plate is ready for use and may be employed to ionize gases, to neutralize static in a variety of types of equipment, to kill microorganisms and for various other purposes where a high intensity of radiation is desirable.

It is also possible to obtain a satisfactory glaze by using a dry mixture of radium or other radio-active salt mixed with a diluent salt, for example, a small proportion of radium salt and a relatively large proportion of barium salt. The wet method described hereinbefore, however, is preferred.

As indicated hereinbefore, a variety of diluent salts can be employed, although barium salts are preferred. Thus, for most purposes barium chloride is desirable because of its relatively low melting or fusion temperature and also because barium possesses chemical properties similar to those of radium. But any salt or combination of salts which will form an insoluble glaze upon the base at a temperature low enough to avoid volatilizing the radio-active salt can be used. For example, barium bromide alone does not form a satisfactory glaze under the conditions of operation because of its relatively low decomposition temperature. However, if barium bromide is mixed with barium chloride a satisfactory glaze is obtained. Likewise, barium sulfate alone will not form a satisfactory glaze at a temperature low enough to eliminate the possibility of volatilizing the radium salt but may be used with other salts in a low fusing mixture.

The proportion of inactive salt to radio-active salt is not limited to the 10:1 ratio described in the foregoing example. In certain cases, especially when the amount of activity is desired per unit of surface area is relatively large the proportion of inactive salt can be substantially reduced or entirely eliminated if the radio-active salt alone gives a satisfactory glaze. In general, proportions of diluent salt larger than 10:1 are not desirable. Larger proportions result in the formation of an excellent glaze but tend to reduce the efficiency of the final film by increased shielding of the alpha radiations. However, in some instances when a degree of masking of alpha radiations can be tolerated, the diluent may be as much as twenty-five times the radio-active salt.

Our invention, in addition to assuring high alpha ray efficiency and thorough distribution of the radio-active material in the film, possesses a further advantage in that it assures that the radio-active material is firmly bonded to the member and not fugitive. Thus, the radio-active substances in the glaze are insoluble in water and a great variety of other solvents and are not displaced by the rubbing or heating attendant upon ordinary handling. Hence, the hazard to health from radium poisoning is minimized.

We claim:

1. In the manufacture of apparatus for ionizing gases, the improvement which comprises coating a ceramic member with a salt of a radio-active element while substantially avoiding impregnation of the member with the salt and heating the coated member to form by reaction between the radio-active salt and the surface of the ceramic member a glaze on the surface thereof containing the radio-active element.

2. In the manufacture of a member capable of emitting alpha rays adjacent the surface of the member, the improvement which comprises applying substantially only to the surface of a ceramic member a solution of a salt of a radio-active element, drying the solution and heating the ceramic member thus coated to form by reaction between the radio-active salt and the surface of the ceramic member a glaze on the surface thereof containing the radio-active element.

3. In the manufacture of a member capable of emitting alpha rays, the improvement which comprises coating substantially only the surface of a ceramic member with a compound of a radio-active element and heating the coated ceramic member to cause the ceramic to combine with the compound to form a glaze on the surface of the ceramic member containing the radio-active element.

4. In the manufacture of a member capable of emitting alpha rays, the improvement which comprises coating an unglazed but relatively non-porous porcelain member with a compound of a radio-active element, while substantially avoiding impregnation of the member with the compound and heating the porcelain member thus coated to form by reaction between the radio-active compound and the surface of the porcelain member a glaze on the surface thereof containing the radio-active element.

5. In the manufacture of a member capable of emitting alpha rays, the improvement which comprises applying to a surface of a ceramic member a solution of a salt of a radio-active element in liquid, the ceramic member being heated to the temperature in the neighborhood of the boiling point of the liquid prior to applying the solution thereto, drying the solution relatively rapidly on the surface of the member and substantially avoiding impregnation of the member with the salt and heating the resultant coated member to form by reaction between the radio-active salt and surface of the ceramic member a glaze on the surface thereof.

6. A film formed substantially only at the surface of a ceramic member and comprising a glaze made by fusing a radio-active compound with the ceramic at the surface, said film having a high efficiency with respect to alpha ray emission while tending to retain emanations and solid decay products of the radio-active compound.

7. A film formed substantially only at the surface of a ceramic member and comprising a glaze made by fusing a salt of a radio-active element and a salt of another element with a ceramic at the surface, said film having a high efficiency with respect to alpha ray emission while tending to retain emanations and solid decay products of the radio-active element.

8. A film formed substantially only at the surface of a substantially non-porous ceramic member and comprising a glaze made by fusing a radio-active compound with the ceramic at the surface, said film having a high efficiency with respect to alpha ray emission while tending to retain emanations and solid decay products of the radio-active compound.

9. A film formed substantially only at the surface of a ceramic member and comprising a glaze made by fusing a salt of radium with the ceramic at the surface, said film having a high efficiency with respect to alpha ray emission while tending to retain emanations and solid decay products of the radium.

10. A film formed substantially only at the surface of a ceramic member and comprising a glaze made by fusing a salt of radium and a salt of barium with the ceramic at the surface, said film having a high efficiency with respect to alpha ray emission while tending to retain emanations and solid decay products of the radium.

11. A film formed substantially only at the surface of a ceramic member and comprising a glaze made by fusing a salt of a radio-active element and a salt of a non-radio-active element with the ceramic at the surface, the salt of the non-radio-active element being present in substantial proportions but not to exceed about ten times the proportion of the salt of the radio-active element and said film having a high efficiency with respect to alpha ray emission while tending to retain emanations and solid decay products of the radium.

WILLIAM H. BYLER.
CLARENCE W. WALLHAUSEN.